United States Patent Office 3,432,868
Patented Mar. 18, 1969

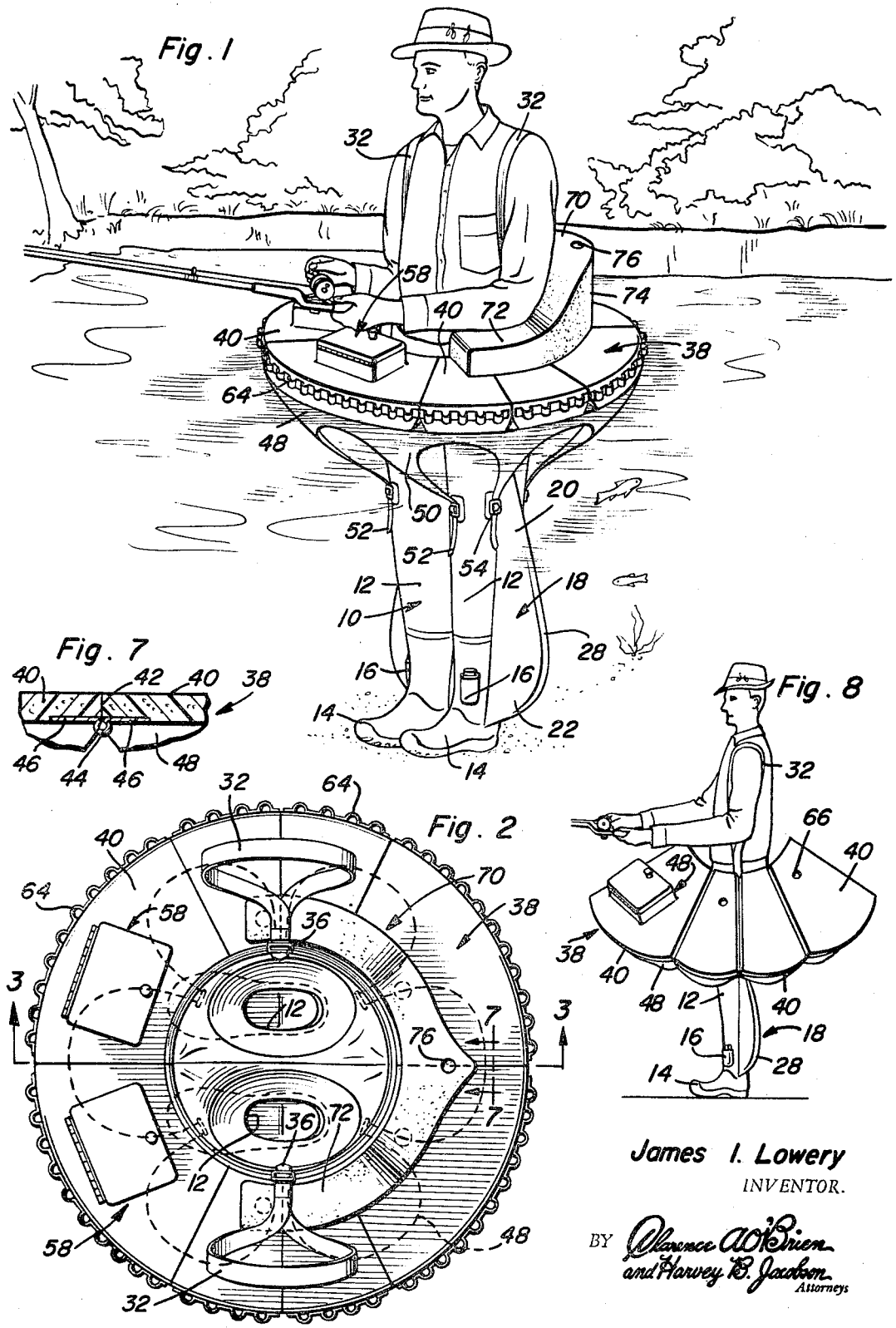

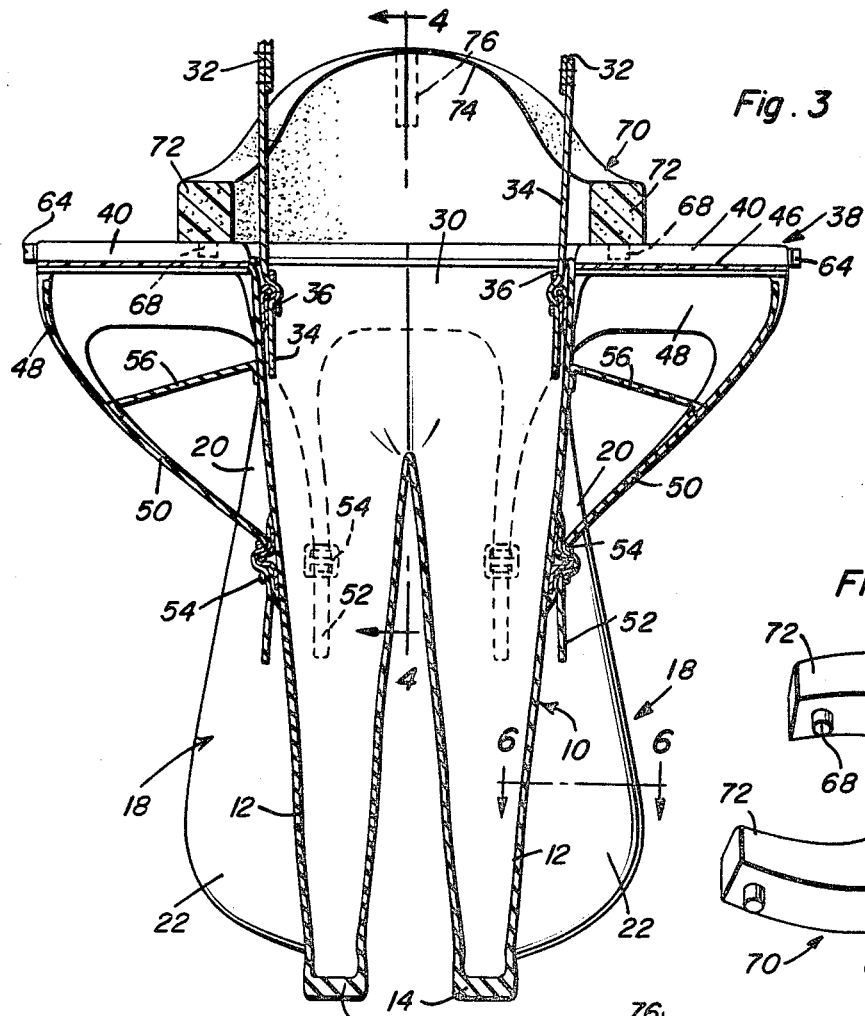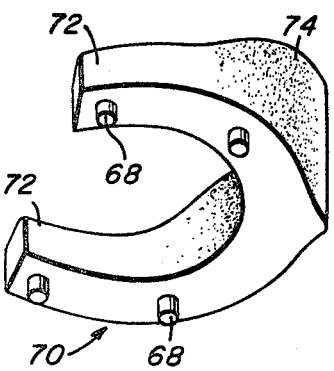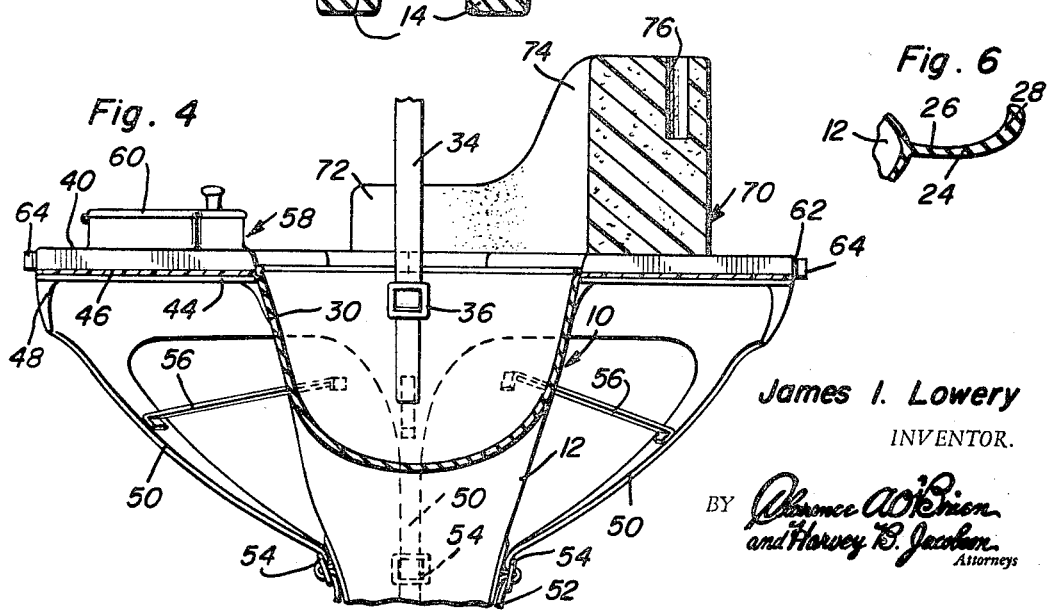

3,432,868
FLOAT-EQUIPPED WADING BOOTS WITH PROPELLING FINS
James I. Lowery, Houston, Miss., assignor of ten percent each to Ronald James Lowery, Deborah Joy Lowery, and Peggy Ann Lowery, all of Houston, Miss.
Filed June 7, 1967, Ser. No. 644,245
U.S. Cl. 9—343
Int. Cl. A41d *13/00;* A63b *31/12*
7 Claims

ABSTRACT OF THE DISCLOSURE

The wading boots shown are hip high, are attached to and depend when in use from a collapsible annular body-encircling float. This float permits a fisherman to wade safely in streams while remaining dry. When expanded the float provides a ledge-like platform for accessible tackle boxes and an optionally attachable collar providing armrests and a backrest. Shoulder straps serve as suspenders. Apron means below the float is equipped with holddown straps which are attachable to the legs of the boots. Special propelling fins on these legs enable the fisherman to "paddle" from place to place in the water which is being fished.

BACKGROUND OF THE INVENTION

This invention relates to certain new and useful improvements in hip boots for use by fishermen when wade fishing in streams, large and small lakes and the like, and has to do with novel multipurpose boots which are unique in that the legs of the boots are equipped with propelling and wading fins. The hip portions are attached to an annular body-encircling outstanding float which keeps the fisherman afloat and dry and serves other purposes which will be made evident from the following description and views of the drawings.

Prior art

The state of the art to which the present invention pertains can be ascertained by referring, if the reader so desires, to the waterproof fishing garment shown in the patent to Meyers 2,276,082. This patented adaptation, entitled Boot Boat, reveals waist-high waders or boots having suspenders, fins on the leg portions of the boots, and an inflatable and deflatable life-preserver-type float and is accordingly broadly analogous to the invention herein presented. The object of the invention disclosed invention is to provide improved leg fins, a puncture-proof float which functions as a ledge-type tackle box shelf, which also supports an optional buoyant collar, and has a depending apron or skirt with holddown straps which are capable of being buckled to the legs of the boots.

SUMMARY

Briefly, the waders as such, are regular waist-high boots (made of plastic, nylon, rubber or a combination of such materials) whose legs terminate at lower ends in integral over-shoes similar to those on conventional boots. The respective legs are provided with outstanding downwardly widening flexible and resilient fins (resembling chaps) which are concavo-convex in cross-section and are self-responsive in action to facilitate walking and wading from one fishing spot to another. The wearer is safeguarded and kept afloat by the waist-high body-encircling float which is collapsible but expanded when in use. It is annular, made up of hinged foam rubber segments, is marginally provided with an apron having holddown straps, serves as a support shelf and, if desired, supports a buoyant collar providing a backrest and armrests.

The fins are unique in that they are commensurate in length with the length of the legs, are flexible and flap actively in and out for walk-along propulsion needs and have lengthwise reinforcing beads which impart the marginal configuration and shape which has been found to be best suited for the travel action desired. By using segmental or sector-shaped blocks of foam rubber and flattening the upper surfaces the desired shelf-like platform becomes efficient and effective as support means for tackle boxes and other wade fishing purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a view in perspective showing the float-equipped waist-high wading boots wherein the leg portions are provided with outstanding normally vertical wading fins and how the complete self-contained device is worn and used.

FIG. 2 is a top plan view on an enlarged scale and which shows with particularly the construction of the ledge-like or shelf-type float means, the position and manner of use of the attachable and detachable buoyant collar, the shoulder straps in upstanding relationship and permanently attached tackle boxes.

FIG. 3 is a vertical sectional view taken on the plane of the line 3—3 of FIG. 2.

FIG. 4 is a fragmentary suitably enlarged view with parts primarily in section and taken on the plane of the vertical section line 4—4 of FIG. 3.

FIG. 5 is a view in perspective of the optional attachable and detachable buoyant collar.

FIG. 6 is a horizontal fragmentary sectional view on the section line 6—6 of FIG. 3.

FIG. 7 is a fragmentary detail view on an enlarged scale taken on the plane of the line 7—7 of FIG. 2, and FIG. 8 is a view on a smaller scale based on and similar to FIG. 1 and showing how the block-like components of the float means swing or fold down when not being used.

DESCRIPTION OF THE PREFERRED EMBODIMENT

By way of general reference to the description of the details the self-contained ready-to-use device can be visualized as characterized by waist-high boots or waders with fin-equipped leg portions, suspenders, and a float-equipped body-encircling annulus. Considered from another point of view the annular float means may be construed as attached to and carrying fin-equipped boots and with marginal apron means.

It may be best to start with the wading boots denoted generally (FIG. 1) by the numeral 10. These waist-high boots are in and of themselves not unusual and include snug-fitting but conformable leg portions 12 having integrally attached boot-type shoes 14 at their lower ends. Just above the boots are open-top pockets 16 provided with insertable and removable weights (not detailed) and used for ballast purposes. The medium outward lengthwise edge portion of each leg portion is provided with a novel stabilizing and wading fin which is denoted generally at 18. Each fin is the same in construction and a description of one will suffice for both. The fin extends approximately from the thigh portion of the leg portion down to the shoe level. In fact it decreases in width and the upper narrower portion is denoted at 20 and the lower enlarged and then receding portion is denoted at 22. Each fin is of the cross-section shown in FIG. 6 wherein it will be noted that it is concavo-convex thus providing a convex forward lengthwise surface 24 (FIG. 6) and a concave rearward and cupping surface 26. The main part of the fin is flexible and resilient. The outer marginal edge is formed into a reinforcing bead 28 which curves rearwardly and inwardly. This fin has the desired flexible, resilient and yielding properties deemed to be necessary in shape and proportions to achieve the desired propelling action. It follows that each fin stands out to assume the approximate radial or vertical position shown for example in FIGS. 1, 3 and 8. The fin is pressure-responsive and adapts itself to the advancing and rearward alternate motions of the legs of the wearer as he advances and walks, as it were, from one fishing spot to another. The upper edge or waist-encircling portion of the boots is denoted generally at 30 in FIG. 3 and it is to this portion that the shoulder straps 32 are connected. The shoulder straps are of the loop-like form shown in FIGS. 1 and 8. The lower terminal end portions 34 can be connected to adjusting and anchoring buckles 36 which are appropriately fastened to diametrically opposite sides of the waist portion 30. The shoulder straps conjointly provide a pair of suspenders. It will be observed however that waders or hip-boots which are presently in use resemble the boots herein shown except that the shown boots are improved in that the leg portions are provided with special propelling and properly paired fins 18.

Of significance and importance is the float means. This means, unlike the aforementioned patented inflatable and deflatable tube or buoy is unique. That is to say, the float means here comprises an outstanding body-encircling shelf-like buoy or float which is denoted generally by the numeral 38. More specifically this float means is made of of semicircular companion half portions as shown in FIG. 2 and wherein each half portion in turn embodies segmental or sector-shaped buoyant blocks made of foam rubber or the like. The blocks are denoted at 40 and have abutting edges 42 (FIG. 7) with the edge portions joined by a fabric or suitable canvas or equivalent connecting web having a hinged portion 44 and flap portions 46 molded in place in a manner to connect the blocks and also to permit the same to fold and swing downwardly and inwardly to assume the position shown in FIG. 8 and to facilitate donning the device when it is initially put to use. Then, too, this foldable and collapsible adaptation permits the device to be removed when the shoulder straps are detached. The outer marginal or encompassing portion of the float means is provided with a thin plastic skirt-like apron 48 (FIGS. 1 and 3) which is of endless type and when in use depends in the manner illustrated and is provided at circumferentially spaced points with downwardly tapering independent holddown straps 50. The lower free end portions 52 of the straps are adapted to be adjustably buckled as at 54 on the aforementioned leg portions. Then, too, as shown in FIG. 3 the median part of each holddown strap is provided with an elastic stay or band 56 one end of which is attached to the leg portion and the other end to the holddown strap. These members 56 assist in maintaining the float blocks in a substantially coplanar position to serve not only as a float but also as a ledge-like shelf. This shelf provides a support and may be equipped with integrally attached tackle boxes, one of which is shown at 58 and which has a knob-equipped hinged lid 60. The outer end portions 62 of the blocks are encompassed by appropriate loops 64 which can be employed to accommodate component parts of a readily attachable and detachable duct blind (not shown). It will be further noted that the inward end portions of certain of the blocks are provided with sockets 66 to accommodate attaching and retaining plugs or dowels 68 (FIG. 5) on the underneath side of a readily attachable and detachable foam plastic collar 70. This collar when in place provides a pair of opposed armrests 72 and an intervening part which is referred to generally as a backrest 74. This horseshoe-type collar is optional but has been found to be highly successful when used. With reference to FIG. 4 is will be seen that the median part of the collar is provided with a vertical socket 76 which can be used to accommodate the staff or handle of an umbrella (also not shown).

It is submitted that the views of the drawings considered singly and collectively should enable the reader to comprehend the nature of the special fin-equipped waders and suspender means therefor, the encircling multipurpose shelf-like float means, the depending apron means with holddown straps, the optional buoyant collar 70 of FIG. 5 and the other component parts. It should also be clear how each part is made and how they coordinate in providing the overall readily applicable and removable safeguarding and wading device. Accordingly, a more detailed description is deemed to be unnecessary.

With a view toward emphasizing significant aspects of the overall concept, it is reiterated that the horseshoe collar referred to generally as the backrest 74 is optional and, in addition, may be of some form varying slightly from that illustrated in the drawings. It is also desirable here to state that while the collapsible float-like means 38 is shown as attached to and constituting a component part of the waders 10, a modified approach is within the purview of the invention. More explicitly, it is feasible and practical, it is submitted, to construct the float means 38 in the form of an intact or ready-to-use wader attachment. Stated otherwise, a manufacturer may prefer to produce and sell the waders or hip boots by themselves, the collapsible float means, with or without the backrest, by itself and, more properly, to provide custom made waders and float means varying in shape, size and material to be fitted around the waist portion of the waders and perhaps provided with clips or other attaching devices for a body-encircling belt (not shown). The tackle boxes need not be made integral as shown but may be produced separately and bolted or otherwise mounted on the shelf-like float means. The sectors or segments constituting the blocks 40 can vary in shape, size and material and can be much thinner in dimension than shown (for emphasis only) in the drawings. Then, too, it is even likely that suitable motor power means (not shown) could be expressly constructed and in some practical manner mounted on the assembly shown in FIG. 1 to assist the user in propelling himself from place to place.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use by a fisherman when wade fishing in a stream, lake or the like, multipurpose boots embodying leg portions provided at their lower ends with integral overshoes and at upper ends with a suitably contoured waist-encompassing body and buttocks portion equipped with shoulder straps providing suspenders, and body-encircling float means cooperatively surrounding said body portion, said leg portions having wading and propelling fins joined to and extending along the lengthwise outwardly disposed sides thereof, each fin being substantially commensurate in length with the length of the leg portion to which it is attached, being flexible and resilient and providing the responsive flapping action called for as the wearer walks along wading and helpfully propelling himself step by step from one to another fishing spot, said fin being concavo-convex in transverse cross-section and providing a lengthwise convex leading surface and a lengthwise concave trailing surface, each fin being gradually increased in width from its upper to its lower end and has an outer marginal edge provided with a longitudinal reinforcing bead commensurate in length with the overall length of said leg portion which imparts and maintains a normal rearwardly cupped shape to the overall fin yet allows said fin to flex and flap rearwardly and inwardly to achieve a feathering action when each forwardly advancing step is undertaken by the wearer.

2. The multipurpose boot according to claim 1, and wherein said float means is annular in plan, is collapsible and when expanded provides a ledge-like shelf assuming an outstanding generally horizontal position capable of use as a support for tackle boxes and for such other purposes as may be needed, and, in combination, a self-contained one-piece buoyant horseshoe-shaped collar adapted to be seated and supported flatwise atop said float means and designed and constructed to provide a curvate backrest and accompanying complemental cushioned armrests.

3. The multipurpose boot defined in and according to claim 2, and wherein said float means embodies a plurality of moldable companion blocks of buoyant material having adjacent abutting ends foldably joined by flexible assembling and hinging webs, said blocks having inner ends flexibly joined to coacting edges of said body portion and having outer ends which can swing and fold downwardly toward said leg portions when out of use.

4. The multipurpose boot according to claim 3, and wherein a skirt-like endless flexible apron is joined to the outer ends of said blocks and is provided with circumferentially spaced depending holddown straps whose lower ends can be and normally are adjustably buckled to leg portions with which they are cooperable in a predetermined manner.

5. For use by a fisherman when wade fishing, a readily applicable and removable multipurpose device comprising, in combination, annular body-encompassing float means characterized by a plurality of buoyant blocks substantially segmental in plan and having substantially flat top surfaces, adjacent marginal edges of the respective blocks being connected together by hinging webs which permit the blocks to cooperatively assume a coplanar shelf-forming position, or to fold down to a collapsed state to facilitate removing and donning the device, waders including leg portions having integral foot portions at their lower ends and a body portion at the top, said body portion being associatively cooperable with an inner peripheral edge portion of the encompassing float means, said float means having a marginally encircling skirt-like apron provided with depending holddown straps adjustably anchored on adjacent leg portions, and said leg portions being provided with diametrically opposite vertically elongated fins, said body portion being provided with supporting means.

6. The device defined in and according to claim 5 and wherein each leg portion is provided with a companion wading and propelling fin, each fin being integral with the external surface portion of the leg portion on which it is mounted, each fin being substantially commensurate in length with the length of said leg portion, being flexible and resilient and providing a significant responsive flapping action which greatly assists the wearer as he walks along wading and assists him in propelling himself step by step from one fishing spot to another spot, said fin being concavo-convex in transverse cross-section and having a lengthwise convex leading surface and a corresponding lengthwise concave trailing surface, each fin being gradually increased in width from its upper to its lower end and having an outer marginal edge provided with a coextensive longitudinal reinforcing bead which functions to impart and to maintain a normally rearwardly cupped shape to the overall fin.

7. The device defined in and according to claim 6 and wherein said float means is annular in plan, is collapsible and normally expanded and spread in a manner to provide a ledgelike shelf, said shelf assuming an outstanding generally horizontal position capable of use as a support for tackle boxes and needed paraphernalia, and in combination, a self-contained one-piece buoyant horseshoe-shaped collar, said collar being of compressibly resilient material and adapted to be seated and supported flatwise atop said float means and, thus designed and constructed, being adapted to provide an upstanding curvate backrest and accompanying complemental cushioned armrests.

References Cited

UNITED STATES PATENTS

| | | | |
|---|---|---|---|
| 240,785 | 4/1881 | Thompson | 9—340 X |
| 3,022,524 | 2/1962 | Hultquist | 9—337 X |

FOREIGN PATENTS

| | | |
|---|---|---|
| 717,409 | 10/1931 | France. |
| 736,888 | 9/1932 | France. |

FERGUS S. MIDDLETON, *Primary Examiner.*

T. W. BUCKMAN, *Assistant Examiner.*

U.S. Cl. X.R.

9—309, 349